(12) United States Patent
Becker

(10) Patent No.: US 6,363,752 B1
(45) Date of Patent: Apr. 2, 2002

(54) ROLLER-HEARTH KILN FOR HEATING GLAZING SHEETS

(75) Inventor: Guido Becker, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/147,778

(22) PCT Filed: Jul. 1, 1998

(86) PCT No.: PCT/FR98/01407

§ 371 Date: Jul. 12, 1999

§ 102(e) Date: Jul. 12, 1999

(87) PCT Pub. No.: WO99/02458

PCT Pub. Date: Jan. 21, 1999

(30) Foreign Application Priority Data

Jul. 5, 1997 (DE) .......................................... 197 28 787

(51) Int. Cl.[7] .............................................. C03B 29/12
(52) U.S. Cl. .............................. 65/273; 65/104; 65/119
(58) Field of Search ........................ 65/29.19, 95, 104, 65/105, 106, 107, 114, 119, 273; 34/553, 554, 569, 611; 432/48, 49

(56) References Cited

U.S. PATENT DOCUMENTS 4,336,442 A * 6/1982 Starr .......................... 219/400
4,390,359 A * 6/1983 Reunamaki .................. 65/114
5,150,534 A * 9/1992 Kramer ........................ 34/638
5,368,624 A * 11/1994 Lehto et al. ................ 65/29.19
5,647,882 A * 7/1997 Thiessen ..................... 65/348
5,669,954 A * 9/1997 Kormanyos .................. 65/273

FOREIGN PATENT DOCUMENTS

| DE | 27 41 098 | * | 3/1979 |
| DE | 40 10 280 | * | 10/1991 |
| DE | 4 336 364 | * | 4/1995 |
| EP | 0 721 922 | * | 7/1996 |
| GB | 2 083 456 | * | 3/1982 |
| WO | 98/03439 | * | 1/1998 |

OTHER PUBLICATIONS

Derwent abstracts, no. 1996–404377, FI 97378 B (Aug. 1996).*

* cited by examiner

Primary Examiner—Sean Vincent
(74) Attorney, Agent, or Firm—Oblon, Spivak, McClelland, Maier & Neustadt, P.C.

(57) ABSTRACT

A roller furnace for heating windows to their softening temperature. The furnace is provided above a roller transportation track. Vanes forming blowing nozzles are arranged transversely to the direction of movement of the windows in order to blow hot gas onto the top surface of the window. A radiative heater is provided below the roller transportation track to heat the bottom of the window.

6 Claims, 2 Drawing Sheets

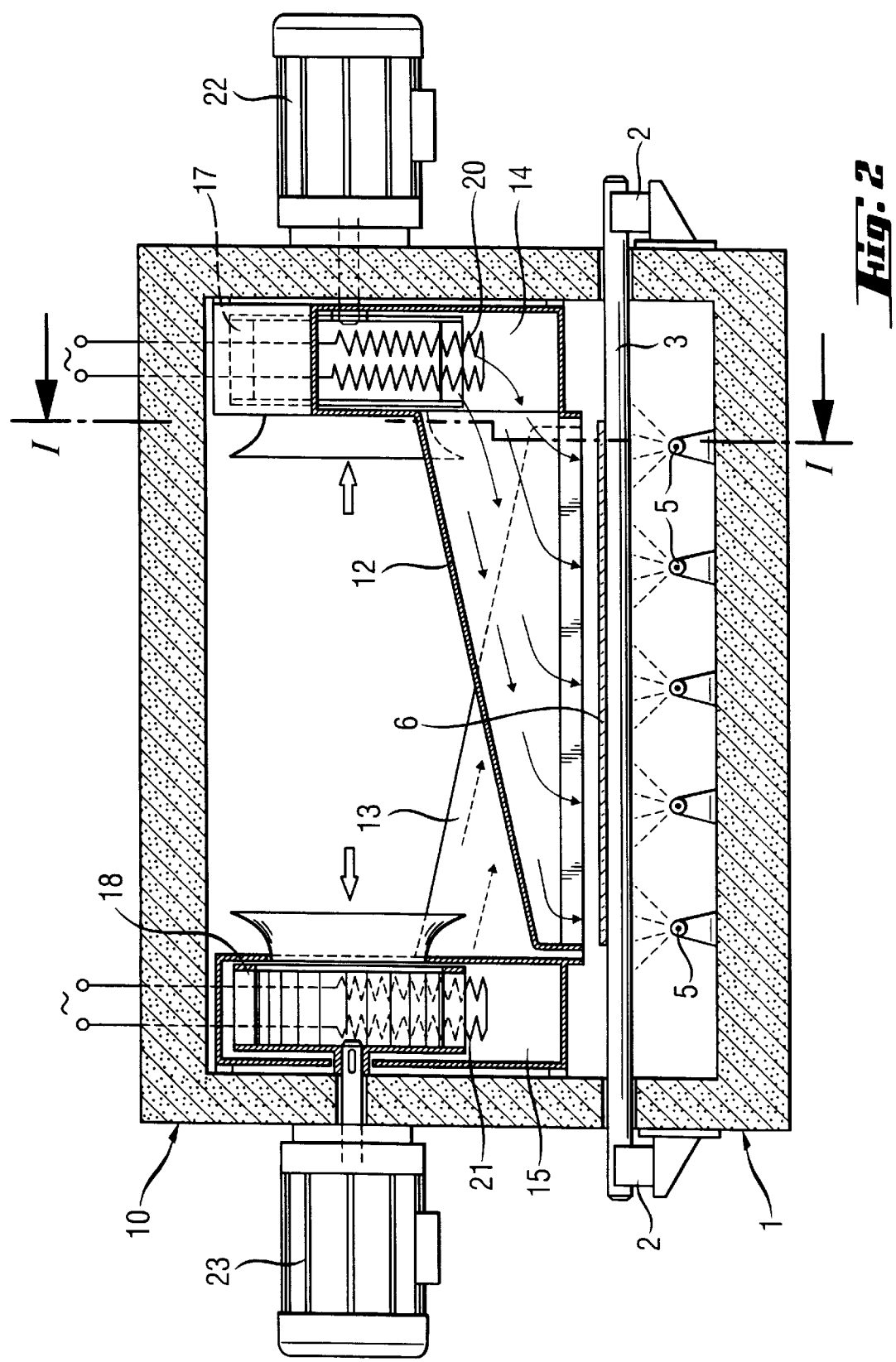

ROLLER-HEARTH KILN FOR HEATING GLAZING SHEETS

BACKGROUND OF THE INVENTION

1. Field of the Invention

The present invention relates to a roller furnace for heating windows to their softening temperature.

2. Discussion of the Background

Roller furnaces for heating windows are known in various forms of construction. They are used when the windows have to be bent or toughened in plants provided downstream or when enamels applied to the windows must be fired on. In this case, the windows are generally heated by radiation, in particular by electrical heating elements. The roller furnaces may be designed as continuous furnaces or as furnaces in which the windows undergo an oscillating motion.

When the windows cannot be heated very uniformly on both sides, convex or concave deformations of the window are inevitable during the heating process. In this case, the window deforms on the side heated most and takes on a convex shape. The risk of such deformations is particularly marked when the windows are provided with a surface coating. When coated windows are heated, the coated side is as a general rule uppermost given that, depending on the type of coating, the latter could otherwise be damaged while being transported along the rollers. The coating layers may consist of layers which absorb thermal radiation, as is the case, for example, with firing inks, or of layers which reflect radiation, such as those used as thermal protection layers or as solar protection layers. Whereas in the first case the topside of the window in the furnace is heated more by the radiant heat, in the second case it remains distinctly cooler given that the thermal radiation is reflected by the layer. Consequently, in these cases, the windows deform in opposite directions.

Given that it is particularly difficult in the case of windows provided with a heat-reflecting surface layer to heat the window uniformly, and without causing undesirable bending, by radiant heat, roller furnaces which heat the windows by convection have been developed. Such convection furnaces are, for example, known from documents DE 4,010,281 A1 and DE 4,336,364 A1. In the case of these known convection furnaces, the windows are heated on both sides by blowing, using a hot gas. For this purpose, vanes forming blowing nozzles are arranged both above and below the plane of transportation of the windows, transversely to the direction of movement of the windows, and emerge just above and just below the plane of transportation. By virtue of these vanes forming blowing nozzles, the windows are blown with hot air which, for example, is heated, by electrical heating elements installed in the flow ducts, to a temperature which may reach approximately 700° C. Convection furnaces of this type are relatively flexible with regard to regulating the temperature of the hot blown air. They allow uniform heating even when the windows are coated on one side.

In the case of convection furnaces of the known type, the vanes forming blowing nozzles are arranged between the transporting rollers in the lower part of the furnace, a sufficiently large distance having to be left between the vanes forming blowing nozzles and the transporting rollers so as to allow the hot air to flow. The consequence of this is that the transporting rollers are relatively far apart. Thus, the distances between the lines of support provided by the transporting rollers are themselves relatively large. The risk of the windows deforming under their own weight when they reach their softening temperature increases, particularly when the windows are thin. Moreover, the dead-weight may not be compensated for by the streams of gas which are directed, from below onto the window given that the window is also subjected, on the topside, at the same points, to the same blowing pressure.

SUMMARY OF THE INVENTION

The object of the invention is to develop a roller furnace for heating both window surfaces uniformly, which benefits from the known advantages of convective heating, without the windows present on the transporting rollers being exposed to a significant risk of deforming under their own weight.

This object is achieved according to the invention by the fact that a convective heating means, comprising vanes forming blowing nozzles arranged transversely to the direction of movement of the windows and intended to blow hot gas, is provided above the roller transportation track and an exclusively radiant heating means is provided below the roller transportation track.

A roller furnace according to the invention not only helps considerably to improve the optical quality of the windows, making a close succession of transporting rollers possible, but also has other essential advantages. For example, the manufacturing cost of such a furnace is markedly less than the manufacturing cost of the known convection furnaces, given that the furnace is, below the transporting rollers, of a distinctly simpler construction and relatively low in height. The cost of installing the furnace according to the invention is also considerably less given that, because of the low construction height of the infrastructure of the furnace, a pit no longer needs to be provided in the floor of the factory building, rather the furnace can be mounted above the floor level on a suitable foundation or on a suitable support frame. The investment cost of a furnace according to the invention is thus, overall, appreciably less than in the case of a known convection furnace.

According to a first embodiment, fans, connected to drive motors mounted outside the furnace, are fixed to the internal side walls of the furnace.

According to another embodiment, more particularly suitable for continuous furnaces, the fans are placed in the roof, i.e. facing and above the roller bed, and preferably along a mid-axis parallel to the roller bed. According to this embodiment, the more symmetrical arrangement of the fans within the furnace leads to a more homogeneous and more balanced extraction within the furnace. In addition, the drive motors connected to the fans are thus placed above the furnace, thereby making it possible to reduce the overall width of the furnace compared with the first embodiment.

Furthermore, this second embodiment of the invention provides more room for positioning the heating elements in the ducts conveying the gas. The gas can thus be heated up over a shorter distance. This advantage may allow a controlled temperature gradient to be created over the length of the furnace; in fact, according to this invention, the nozzles placed beneath a fan controlling the temperature can be supplied directly, it also being possible for the temperature of the gas entering all the furnace nozzles to be controlled. Such a temperature gradient over the length of the furnace is especially desirable in the case of continuous furnaces.

BRIEF DESCRIPTION OF THE DRAWINGS

An illustrative embodiment of a furnace according to the invention will be described in greater detail below with reference to the drawings, in which:

FIG. 2: is a sectional view on the line II—II in FIG. 1.

DETAILED DESCRIPTION OF THE PREFERRED EMBODIMENTS

Figure 1:
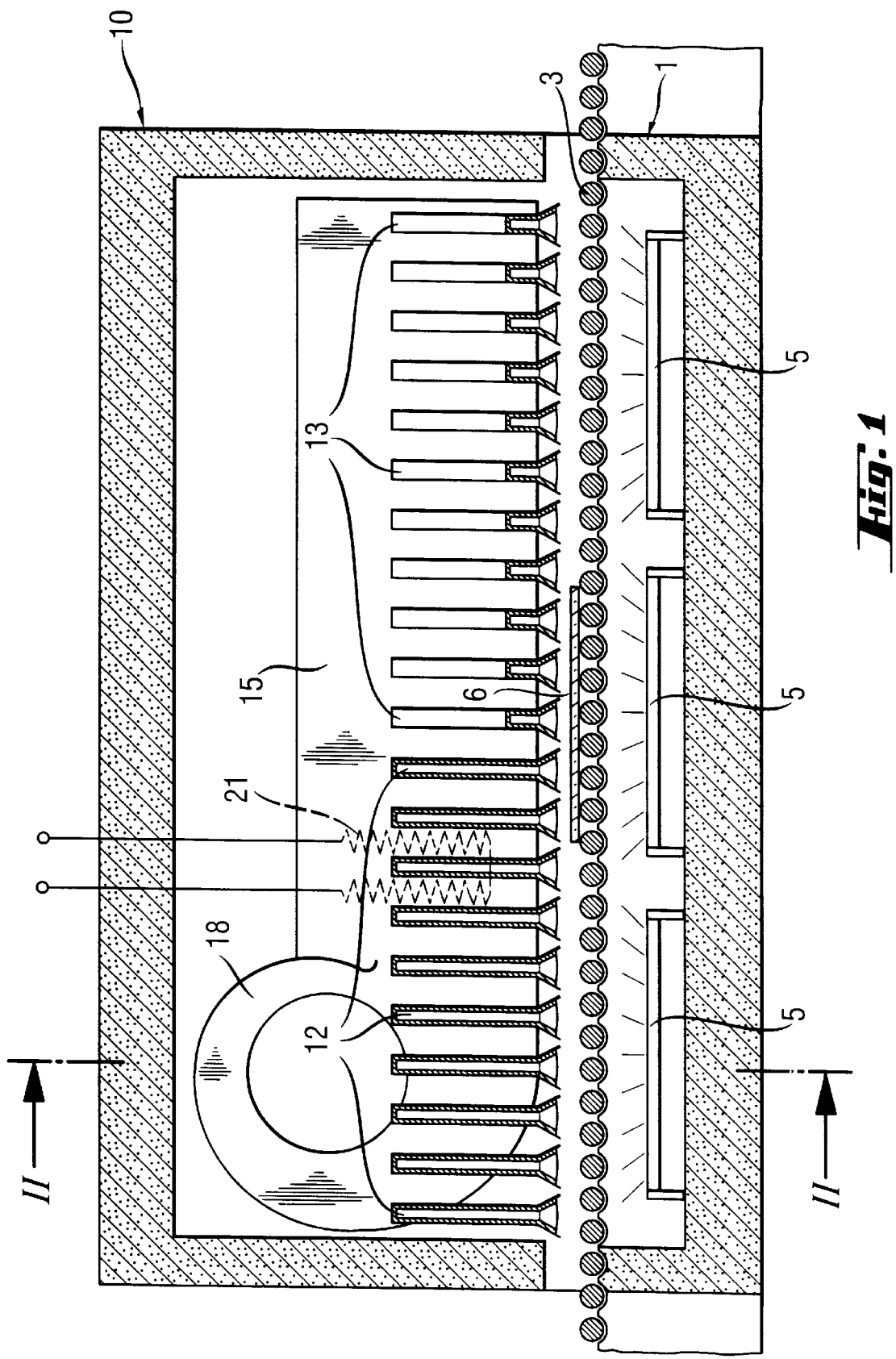
FIG. 1: is a vertical longitudinal sectional view of a roller furnace according to the invention

Given that the construction both of convection furnaces and radiation furnaces are in principle known, it is not necessary to expand further with regard to the constructional details of a furnace according to the invention.

As is clear from the drawings, a roller furnace according to the invention comprises a lower part 1 and an upper part 10. Provided outside the heated part of the furnace, in the lower part 1, are bearings 2 in which the driven transporting rollers 3 are mounted as short a distance apart as possible. The transporting rollers 3 are driven by means of devices which are not shown. When the furnace is designed as a continuous furnace, the transporting rollers 3 are driven continuously in the same direction of rotation. Smaller-capacity furnaces are often provided with a device for driving the rollers in alternating directions of rotation so that the windows present in the furnace undergo an oscillating motion and so that the construction length of the furnace can thus be appreciably shorter.

Electrical heating elements 5, for example in the form of helicoidal filaments, are arranged in the required number in the lower part 1 of the furnace. The underside of the window 6 is heated by these electrical heating elements 5 solely by radiant energy, this heating being achieved, in part, directly by the direct radiation, which strikes the window between the driven transporting rollers 3 directly, but, above all, by the secondary radiation which emanates from the heated transporting rollers 3 and by the direct contact of the window with the driven transporting rollers 3.

In contrast, in the upper part 10 of the furnace, the top side of the window 6 is heated exclusively by convection, because of the fact that hot gas is blown onto the window. For this purpose, vanes forming blowing nozzles 12, 13 are arranged over the entire length of the furnace transversely to the direction of transportation of the windows, i.e. parallel to the driven transporting rollers 3, and are supplied with air heated to a temperature of approximately 650–700° C. via delivery ducts 14 and 15.

In order to produce effective mixing of the hot air and thus to achieve a uniform temperature, two groups of vanes forming blowing nozzles 12 and 13 are arranged in the longitudinal direction of the furnace. Whereas the vanes forming blowing nozzles 12 are supplied with hot air via the delivery duct 14 by a fan 17 arranged near the rear end of the furnace inside the heated part of the furnace, the vanes forming blowing nozzles 13 are supplied with hot air via the delivery duct 15 and a fan 18 which, for its part, is arranged on the side of the furnace opposite the fan 17 and near the front end of the furnace.

The air inside the delivery ducts 14 and 15 is heated by suitable heating elements 20, 21. The drive motors 22, 23 for the fans 17, 18 are, of course, located outside the heated part of the furnace. Both radial fans, such as those shown in the drawings, and cross-flow fans are suitable. When cross-flow fans are used, the arrangement must correspond essentially to that described in document DE 4,336,364 A1.

Of course, the furnace also comprises the usual devices for controlling and regulating the electrical heating elements 5, 20, 21 and the fans 17, 18, so as to guarantee as uniform heating of the windows as possible, in accordance with the respective requirements. The control and regulating devices are advantageously designed in such a way that they are independent of each other so as also to allow, depending on the imposed requirements, a different influx of thermal energy on the topside from the underside of the windows.

What is claimed is:

1. Roller furnace for heating windows to their softening temperature, wherein an exclusively convective heating means, comprising blowing nozzles arranged transversely to the direction of movement of the windows to blow a hot gas onto a top surface of the windows is provided above a roller transportation track and an exclusively radiant heating means is provided below the roller transportation track.

2. Roller furnace according to claim 1, wherein the convective heating means is provided with fans having driving motors therefor, wherein the radiant heating means and the drive motors of the fans are provided with control and regulating devices which allow a different influx of thermal energy on a topside from an underside of the windows.

3. Roller furnace according to claim 1, wherein said convective heating means comprise fans which are positioned on the side walls of the furnace.

4. Roller furnace according to claim 1, wherein said convective heating means comprise fans which are positioned in the roof of the furnace.

5. Roller furnace according to claim 2, wherein the fans are positioned on the side walls of the furnace.

6. Roller furnace according to claim 2, wherein the fans are positioned in the roof of the furnace.

* * * * *